F. B. LAMBERT.
BRICK MACHINERY.
APPLICATION FILED OCT. 9, 1915.
1,353,917.
Patented Sept. 28, 1920.
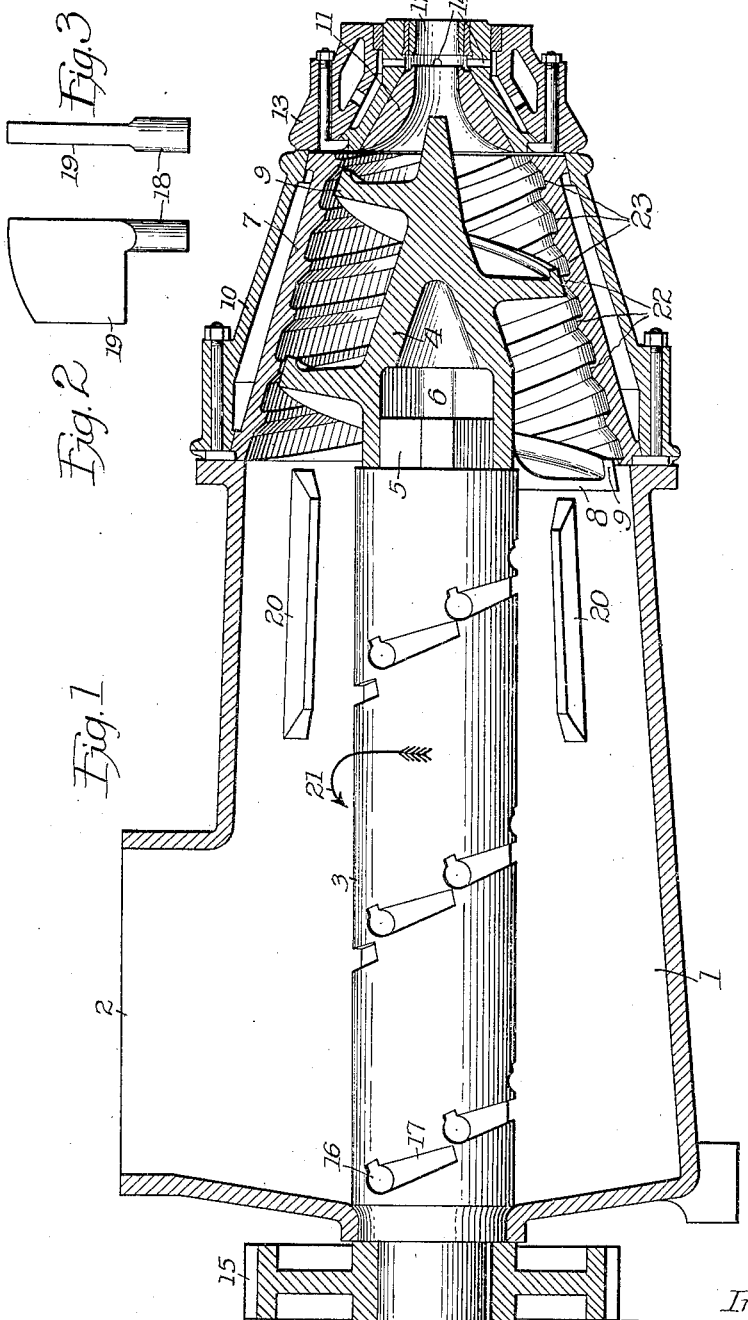
Inventor
Frank B. Lambert
By Brown, Hanson & Boettcher
Attys

UNITED STATES PATENT OFFICE.

FRANK B. LAMBERT, OF CHICAGO, ILLINOIS.

BRICK MACHINERY.

1,353,917.  Specification of Letters Patent.  Patented Sept. 28, 1920.

Application filed October 9, 1915. Serial No. 54,935.

*To all whom it may concern:*

Be it known that I, FRANK B. LAMBERT, a citizen of the United States, residing at Chicago, in the county of Cook and State of Illinois, have invented a certain new and useful Improvement in Brick Machinery, of which the following is a full, clear, concise, and exact description, reference being had to the accompanying drawings, forming a part of this specification.

My invention relates to brick machinery and more especially to a screw and sleeve for forcing the clay through the brick-forming-die.

In practising the process of burning bricks, as set out in my co-pending applications, Serial No. 681,720 filed March 5, 1912, and Serial No. 15,910 filed March 20, 1915, I find that a certain treatment of the clay is desirable in producing the green bricks so that when relatively sudden and intense heat is applied to the bricks, as is practised in accordance with the general process outlined above, the bricks will not be deformed or cracked by expansion and contraction.

The difficulties heretofore experienced in practising said processes have resulted largely from the fact that the clay in the interior of the bricks is pressed together to a greater density than is the clay on the exterior. The present invention aims to provide a machine which will form the bricks with substantially uniform density throughout, or with a slightly greater density upon the exterior than in the interior, so that the natural molecular movement, due to contraction and expansion, and such chemical actions as occur during burning, may not destroy or impair the form or strength of the bricks. In the accompanying drawings, which form a part of the present specification, I have illustrated one embodiment of my invention.

Figure 1 is a longitudinal cross section of a machine constructed in accordance with my invention.

Fig. 2 is a side elevation, and

Fig. 3 is a front elevation of the teeth or blades for working the clay.

The machine which I have illustrated comprises a main mixing barrel or cylinder 1, provided with an opening 2 at the top for feeding the clay, and a main shaft 3 which carries upon its inner end the screw 4. The main shaft 3 has a squared end 5, which fits into a correspondingly squared recess 6, which is formed in the screw 4.

The screw 4 is tapered downward toward its end and is surrounded by a shell or screw casing 7, of corresponding form. The shell 7 fits closely to the screw 4 so that the edges of the fins or screw-blade 8, which are formed with an enlarged edge portion 9, fit closely in the shell 7.

The shell 7 is mounted in an inclosing casing 10, which is bolted or secured in a suitable manner to the main barrel 1. The reduced end of the casing 7 communicates with a nozzle 11 which discharges the clay through the die 12 in suitable shape to be formed into individual bricks. The space between the casing 7 and the outer shell 10, is preferably employed as a steam jacket for keeping the casing 7 and the contents thereof, warm. Similarly the space between the casing 13 and the nozzle 11 is preferably employed as a steam jacket to keep the nozzle 11 warm. The die 12 is preferably lubricated by jets of steam through the openings 14 at the point where the clay passes from the nozzle to the die 12.

The driving end of the main shaft 3 has a suitable bearing in or adjacent the main barrel 1, and has a suitable driving wheel, such as a gear-wheel 15, secured thereto, for driving the shaft 3. The shaft 3 is provided with a helical row of sockets 16 and 17 for receiving the stems 18 and the blades 19, respectively, of suitable knives or teeth, which serve to work and temper the clay and to move it forward toward the nozzle and the die 12.

Adjacent the discharge end of the main barrel 1, a number of longitudinal ridges, 20, are provided. These ridges tend to prevent turning of the mass of clay and insure that the clay will be moved toward the die opening as the main shaft 13 revolves in the direction indicated by the arrow 21.

Heretofore in the art it has been customary to form the casing 7 with longitudinal ridges, which might be considered as continuations of the ridges 20.

Such longitudinal ridges were employed for the same purpose as the ridges 20, namely, to prevent turning of the mass of clay, and to insure its moving forward. Such construction of longitudinal ridges or grooves has resulted in producing brick of a character which is unsuited to rapid burning. Due to the fact that the friction between the clay and the walls of the casing 7 and the die 11, is greater than the friction between adjacent particles of clay at the center, the center of the mass of clay will be moved outward more rapidly than the edges. As a result of such operation, the bricks, when they issue as a ribbon or bar of clay from the die 12, will have a greater density at the central part than at the outer part, the result being that when these bricks are burned they will contract and expand a greater amount at the center than they do at the ouside, and cracking and checking results.

Another disadvantage where the longitudinal grooves are employed is, that the taper or slope of the casing 7 is so great that the clay does not tend readily to move along these grooves or ridges, being churned up at the center and discharged therefrom, in a dense mass with the results above set out.

According to my invention, longitudinal grooves or ridges are not employed, but instead I employ spiral ridges which run in a direction opposite to that of the blade 8 of the screw 4. That is to say, considering the screw 4 as a right-handed screw, the screw threads formed by the ridges 22 and the intervening grooves, are lefthanded.

The effect of thus forming the grooves is marked in the action of the clay as it is propelled toward the nozzle 11 and the die 12.

As soon as a particle of clay is caught by the blade 8, it will tend to adhere more or less to the blade 8 or the edge 9 and as the blade moves forward there will be a slippage between the particle and the blade 8, due, first of all, to the pressure exerted by the teeth or blades 19 on the main shaft, and due to the pressure exerted by the rest of the screw 4, upon the clay contents in the casing 7. In addition, there will be a tendency for the clay particle or mass to be caught by one of the ridges 22, and lifted away from the blade 8. As a result the mass or particle of clay will tend to slide along on the ridges 22 and the grooves 23 formed there-between, and will be compressed by being forced into smaller space as the particle or mass approaches the discharge end of the casing 7. It can thus be seen that the particle or mass of clay has a slip, not only with reference to the screw 4, but has a slip with reference to the walls of the casing 7, so far as rotation is concerned. In the prior art devices such rotation was considered absolutely detrimental, and in those structures it rightly would be so. In the present structure an advantage is gained by having the mass of clay rotate to a certain degree, in that compression of the mass of clay occurs by the clay being forced from the outside toward the center instead of from the center toward the outside.

Compression from the outside is caused primarily by the clay sliding along the grooves 23 and ridges 22 in moving from the relatively larger space in the receiving end of the casing 7 toward the discharge end of the casing 7. The inward movement of the clay is very gradual, due to the fairly long path through which it moves in following the spiral grooves 23 and ridges 22,—that is to say, the angle of compression which the clay must travel is very slight in the device constructed in accordance with my invention, as compared with the angle of travel or compression of the devices of the prior art. The result which is accomplished is a marked improvement over the prior art devices in that the density of the bricks is more nearly uniform and may, in fact, be slightly greater at the outside than at the inside. The ideal condition is to have the bricks of a uniform density throughout. The invention which I have described makes it possible to approach much nearer the ideal condition than has heretofore been known.

The path of the clay may be described as follows:

The clay enters at the feed opening 2 and is worked and tempered by the clay knives 19 and moves forward toward the discharge end of the main barrel 1. It will be noticed that the main barrel 1 is tapered to accommodate the increasing density of the clay as it is discharged. Throughout the portion of the barrel occupied by the ridges 20, the clay is preferably moved along mostly in an axial direction. It is then discharged to the screw casing 7 where the same is rotated about the general axis of movement, namely, the axis of the shaft 3, and is simultaneously compressed by pressure applied from the outside, and then it is discharged into the nozzle 11, where it assumes a lineal movement and is formed by the die 12.

It can be seen that the above provides a new method of manipulating the clay to form the same into bricks.

While I have described my invention with reference to the details of a particular mechanism, I wish it to be understood that the process which I have described may be carried out in other mechanism than that indicated, and that the mechanism for carrying out the process which I have indicated, may be varied in form and proportions without departing from the spirit and scope of my invention.

What I claim is:

1. In a clay press, a sharply tapered screw having a single thread of relatively large pitch, means for rotating the screw, a screw casing having an inner surface closely approximating the outer edges of the screw, said casing having its inner tapered surface substantially covered by a plurality of shallow screw threads alternated with grooves of substantially the same width as the threads.

2. In a clay press, a sharply tapered screw having a single thread of relatively large pitch, means for rotating the screw, a screw casing having an inner surface closely approximating the outer edges of the screw, said casing having its inner tapered surface substantially covered by a plurality of shallow screw threads alternated with grooves of substantially the same width as the threads, the side faces of the threads which receive the clay being inclined to the axis of the screw and adapted to direct the clay toward the axis of the casing as the same is forced forward by the screw.

In witness whereof, I hereunto subscribe my name this 6 day of October A. D. 1915.

FRANK B. LAMBERT.